US005529619A

United States Patent [19]

Warmerdam et al.

[11] Patent Number: 5,529,619
[45] Date of Patent: Jun. 25, 1996

[54] STARCH-BASED ADHESIVE

[75] Inventors: Theo W. Warmerdam, Maassluis; Henk G. Nolten, Naaldwijk, both of Netherlands; Edward W. Day, Middlesex, England; Joseph S. Hetzer, Naperville; Anil B. Goel, Naperville, both of Ill.

[73] Assignee: Reichhold Chemicals, Inc., Durham, N.C.

[*] Notice: The term of this patent shall not extend beyond the expiration date of Pat. No. 5,409,876.

[21] Appl. No.: 467,308

[22] Filed: Jun. 6, 1995

Related U.S. Application Data

[63] Continuation of Ser. No. 154,617, Nov. 18, 1993, Pat. No. 5,490,876.

[51] Int. Cl.⁶ .................. C09J 103/02; C09J 103/04
[52] U.S. Cl. ................... 106/213; 106/176; 106/208; 106/210
[58] Field of Search .................. 106/176, 208, 106/213, 210

[56] References Cited

U.S. PATENT DOCUMENTS

| | | |
|---|---|---|
| 2,212,557 | 8/1940 | Bauer ..................... 134/23.4 |
| 3,719,514 | 3/1973 | Taylor. |
| 3,865,603 | 2/1975 | Szymanski et al.. |
| 3,949,104 | 4/1976 | Cheng et al.. |
| 4,008,116 | 2/1977 | Sebel. |
| 4,121,974 | 10/1978 | Hofreiter et al.. |
| 4,249,547 | 2/1981 | Hinzmann. |
| 4,424,291 | 1/1984 | Leake et al.. |
| 4,587,332 | 5/1986 | Lane et al.. |
| 4,873,147 | 10/1989 | Jansen et al.. |
| 4,902,370 | 2/1990 | Dust et al.. |
| 4,921,795 | 5/1990 | Bozich Jr.. |
| 4,957,563 | 9/1990 | Gallaher et al.. |
| 5,055,503 | 10/1991 | Leake et al.. |
| 5,085,228 | 2/1992 | Mooney et al.. |
| 5,107,866 | 4/1992 | Aronoff et al.. |
| 5,121,758 | 6/1992 | Schmekel et al.. |
| 5,190,996 | 2/1993 | Foran ..................... 524/28 |

FOREIGN PATENT DOCUMENTS

| | | |
|---|---|---|
| 0458233A2 | 11/1991 | European Pat. Off.. |
| 809748 | 3/1959 | United Kingdom. |
| 1571336 | 7/1980 | United Kingdom. |

*Primary Examiner*—David Brunsman
*Attorney, Agent, or Firm*—Bell, Seltzer, Park & Gibson

[57] ABSTRACT

The present invention relates to a starch-based adhesive composition for use in cigarette manufacture. The adhesive composition includes at least about 2 percent of a dispersible-starch that thickens on heating to a temperature greater than about 50° C.

15 Claims, 2 Drawing Sheets

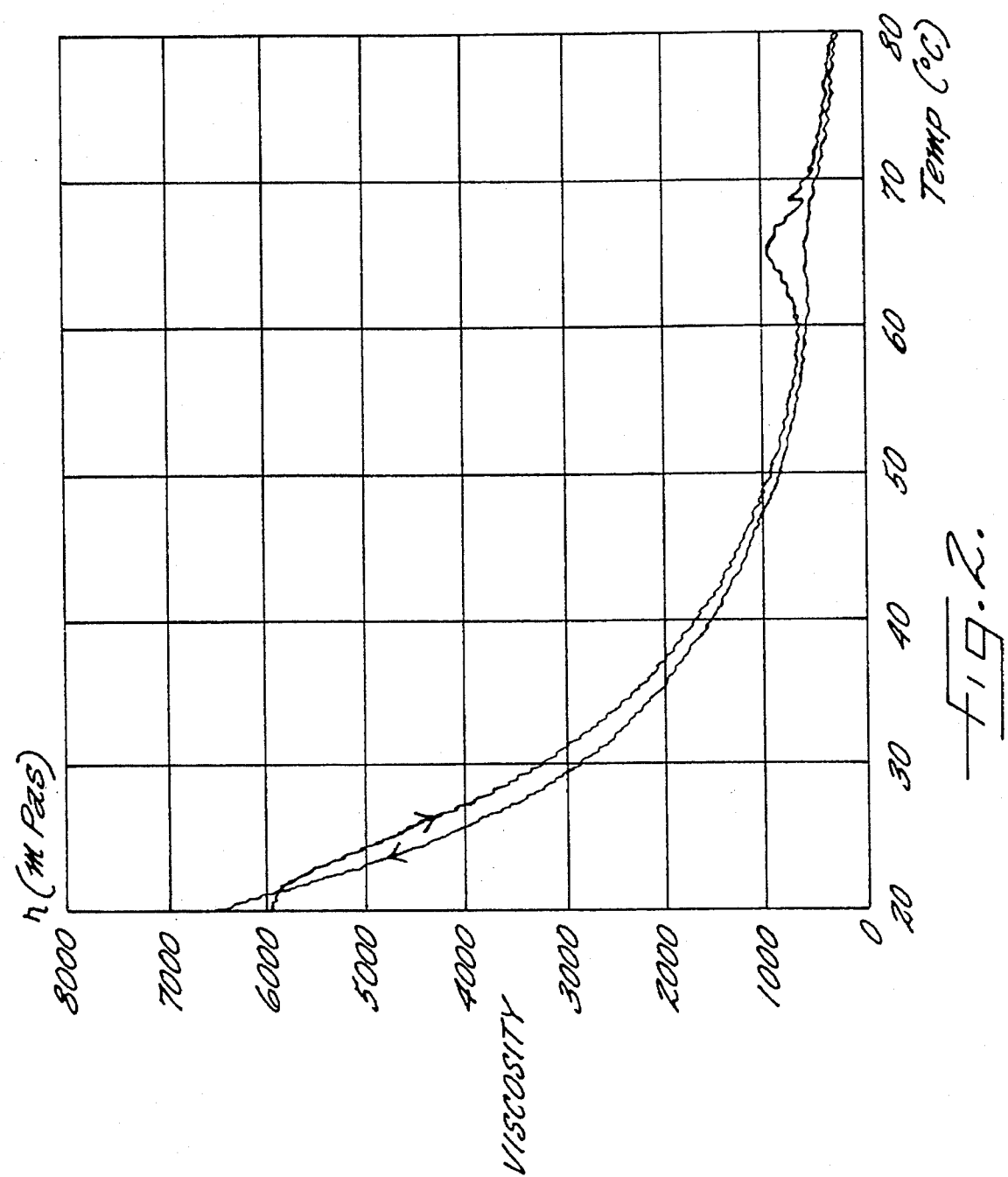

STARCH-BASED ADHESIVE

This application is a continuation of application Ser. No. 08/154,617, filed Nov. 18, 1993, now U.S. Pat. No. 5,490,876.

BACKGROUND AND FIELD OF THE INVENTION

The present invention relates to a starch-based adhesive, and particularly a starch-based adhesive suitable for use in cigarette manufacturing.

Cigarettes are generally comprised of a cigarette rod and most often a filter or plug. The cigarette rod consists of an amount of tobacco wrapped in a paper tube, the paper tube being glued along one longitudinal edge with a suitable adhesive (side seam or lap seal). The filter or filter plug generally consists of crimped cellulose acetate tow treated with a plasticizer and wrapped into a cylindrical form with paper. The center of the paper is attached to the fibers using an adhesive (centerline adhesive) and the paper is then wrapped around the plug rod, overlapping and attaching itself with an adhesive (overlap adhesive) to form the cylindrical filter plug. The filter or plug is then attached to the cigarette rod by wrapping another paper (tipping paper) which contains an adhesive (tipping adhesive) around the plug and overlapping it with an aligned rod.

Typically the seam adhesives are applied via a nozzle of a high speed cigarette manufacturing machine. The equipment speed is typically greater than 5000 cigarettes per minute (cpm), and is often greater than 10,000 cigarettes per minute. At such production rates various properties of the adhesive such as viscosity, solids content and the setting speed become critical. In the past to overcome these obstacles, polyvinyl acetate (PVA) based adhesives have been used. Polyvinyl acetate based adhesives, however, are non-natural based adhesives.

There has been an increased interest in using natural-based adhesives. Exemplary natural-type adhesives include starch-based adhesives and gelatine adhesives. For example, U.S. Pat. No. 5,085,228 to Mooney et al. proposes an adhesive composition comprising a crosslinked starch and a fluidity or converted starch wherein the starches have an amylopectin content of at least about 70 percent by weight. U.S. Pat. No. 5,155,140 to Marten et al. proposes an adhesive mixture comprising 100 parts by weight of water, about 40 to about 120 parts by weight of gum arabic, about 3 to about 80 parts by weight of a starch selected from the group consisting of water-soluble starch degradation products, carboxymethyl starch $(C_6H_{10}O_5)_n$, and gelatinized starch. U.S. Pat. No. 5,121,758 to Schmekel et al. proposes a glue made using pectins such as those obtained by the aqueous extraction of citrus fruit or apples.

There, however, continues to be a need for a natural-based adhesive that will satisfy the requirements of current cigarette manufacturing machines including satisfactory viscosity stability and machinability while not adversely affecting the properties of the cigarette itself.

SUMMARY OF THE INVENTION

The present invention relates to a starch-based adhesive composition for use in cigarette manufacture. The starch-based adhesive composition includes a dispersible unmodified starch, and preferably includes at least about 5 percent of the dispersible unmodified starch.

Preferably the dispersible unmodified starch undergoes gelatinization at a temperature of greater than about 50° C., and preferably greater than about 60° C. The term "gelatinization" or gelling is used to describe a process wherein as hydration of a slurry of the starch in granular form occurs, the water, to overcome hydrogen bonding within the granule, causes the granules to swell. The temperature at which swelling begins to occur is the gelatinization temperature. As the temperature increases, there is an increase in the number and size of the swollen granules and a corresponding increase in the viscosity of the slurry. As viscosity increases the tackiness (i.e., the wet tack) increases and the time it takes for the adhesive to set is faster. Higher viscosity, however, restricts the speed at which cigarettes having the adhesive applied thereto can be made.

The starch-based adhesive of the present invention permits the adhesive to be applied at a low viscosity thus facilitating the running of high speed cigarette manufacturing equipment at speeds in excess of 5,000 cigarettes per minute, and preferably in excess of 10,000 cigarettes per minute. The dispersible unmodified starch then thickens, i.e., increases in viscosity, on heating to a temperature greater than about 50° C. and the wet tack of the adhesive increases. Such heating occurs on the rod heater garniture of a typical cigarette making machine.

BRIEF DESCRIPTION OF THE DRAWINGS

FIG. 2 is a viscosity vs. temperature plot of a sample corresponding to the Comparative Example.

DETAILED DESCRIPTION OF THE INVENTION

Figure 1:
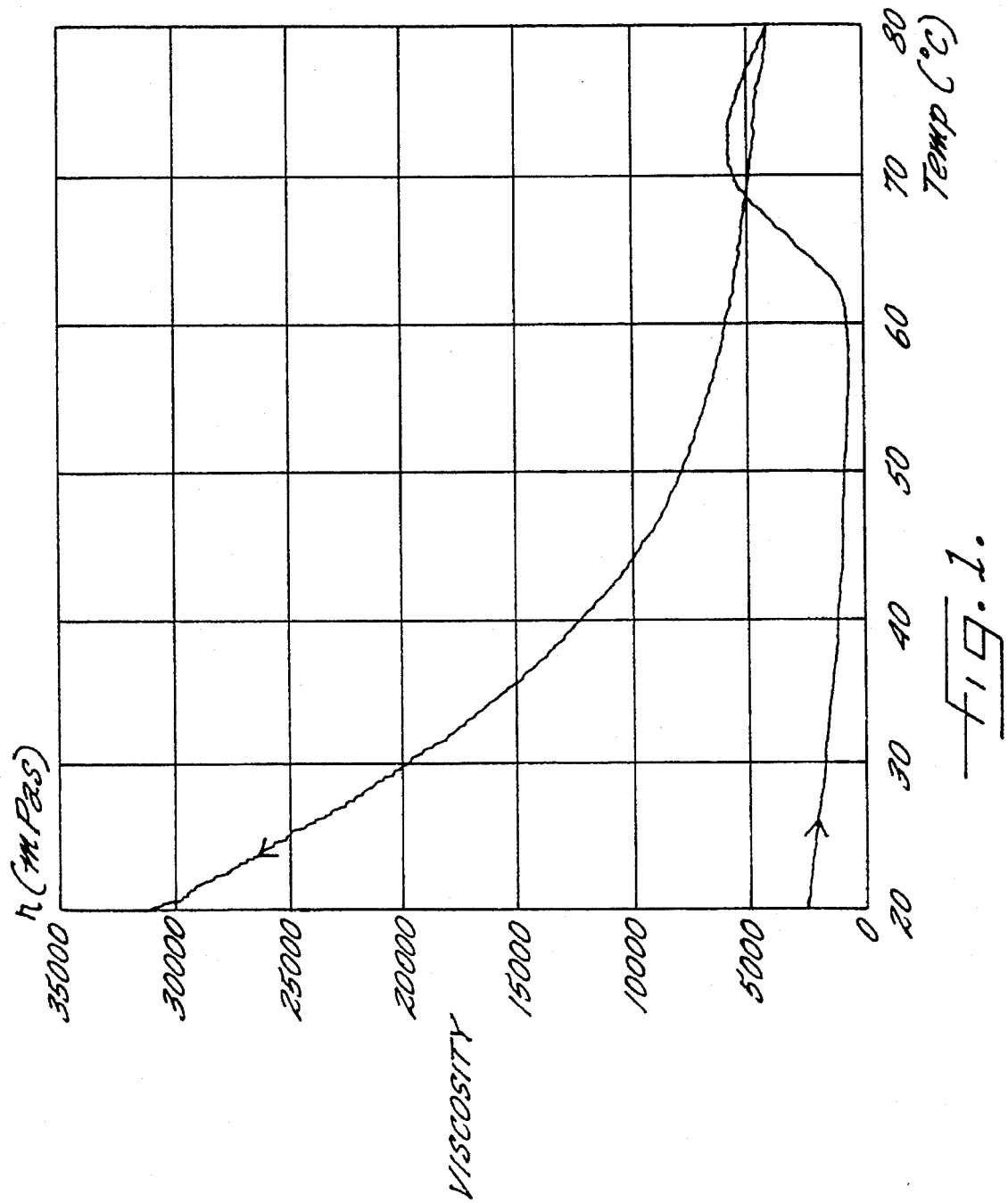
FIG. 1 is a viscosity vs. temperature plot of a sample corresponding to Example 1.

As summarized above, the present invention provides a natural-based adhesive composition suitable for use in manufacturing cigarettes. The adhesive composition includes a dispersible, unmodified starch. Suitable unmodified starches include so-called "native" starches such as maize (corn), wheat, potato, arrowroot, rice, sago, barley, sorghum, rye, triticale, tapioca, waxy maize, waxy sorghum, sweet potato, waxy rice and mung bean.

The unmodified starch is dispersible. The unmodified starch thickens or gels on heating to a temperature greater than about 50° C. Such heating usually occurs when the cigarette is exposed to the rod heater garniture of a typical cigarette manufacturing machine sold commercially, for example, by Hauni-Werke Korber and Co., KG Hamburg, Germany, and is described in their U.S. Pat. No. 4,474,190 to Brand herein incorporated by reference in its entirety.

The adhesive composition typically includes at least about 2 percent by weight of the dispersible unmodified starch, and preferably about 2 to 25 percent by weight of the dispersible unmodified starch. The adhesive composition also includes about 5 to 60 percent by weight of a modified starch, about 0 to 5 percent by weight of a rheology modifier, about 0 to 1 percent by weight of a preservative and about 0 to 1 percent by weight of an anti-foam agent. The adhesive composition is made up in (and the unmodified starch dispersed in) about 40 to 90 percent water and can be formulated using techniques known to those skilled in the art. The adhesive composition has an ambient temperature viscosity of about 1000 cps to 20,000 cps before thickening on heating to a temperature greater than about 50° C. The adhesive composition typically has a pH of from about 3 to 9, preferably from about 5 to 7. The solids content of the adhesive composition is about 10 to 60 percent.

Modified starches include dextrins, dextrans, oxidized starches, starch esters and starch ethers such as carboxylmethyl starches, alkylated starches such as methylated or ethylated starch, hydroxyalkyl starches such as hydroxymethyl-, hydroxyethyl- and hydroxypropyl starch, alkylhydroxyalkyl starch, alkylcarboxymethyl starch, hydroxyalkylcarboxymethyl starch and alkylhydroxyalkylcarboxymethyl starch.

Rheology modifiers include urea, xanthan gum, alginates, casein, carrageen, guar gum, gum ghatti, gum karaya, locust bean gum, gum arabic, agglutinates, alginates (e.g., sodium alginates), and cellulose ethers as salts thereof such as carboxymethyl celluloses, alkyl celluloses (e.g., methyl- or ethyl cellulose), hydroxyalky celluloses, (e.g., hydroxymethyl cellulose, hydroxyethyl cellulose, and hydroxypropyl cellulose), alkylhydroxyalkyl celluloses (e.g., methyl- or ethylhydroxyethyl cellulose or methyl- or ethylhydroxypropyl cellulose), alkylcarboxymethyl cellulose, hydroxyalkylcarboxymethyl celluloses and alkylhydroxyalkylcarboxymethyl celluloses. The rheology modifier facilitates application, particularly through a nozzle, such as used in conventional cigarette manufacturing equipment.

Suitable preservatives are the preservatives typically used in the adhesive and tobacco industries such as sorbic acid, sodium sorbate, potassium sorbate and calcium sorbate, benzoic acid, sodium benzoate, p-hydroxybenzoic acid ethyl ester, benzisothiazolinone, methyl p-hydroxy benzoate, thiadiazine, and p-hydroxybenzoic acid propyl ester and their sodium salts.

Suitable anti-foam agents include mineral oil, silicone, corn oil, glycols, synthetic wax-based anti-foam agents and compounded defoamer formulations, the selection of which will be known to those skilled in the art. Other additives include colorants, surfactants, fragrances and flavorants.

In the operation of manufacturing cigarettes (See U.S. Pat. No. 4,474,190 to Brand), several steps involve the use of adhesives. The starch-based adhesive composition of the present invention may be used in any of the cigarette manufacturing steps. They have been found especially useful in the side seaming operations involved in preparing the cigarette rod where the tobacco is wrapped in overlapping paper and in filter tipping where the filter or plug is attached or joined to the cigarette rod by an overlapping paper which longitudinally extends over the filter tip and part of the rod. They also may be used in the formation of the filter plug as a centerline adhesive where the fibers are attached to the paper and as an overlap adhesive where the paper is wrapped around the plug rod attaching to itself in an overlapping manner and forming the cylindrical filter plug.

The adhesive composition can be used in the newer and faster cigarette manufacturing machines which have production speeds of greater than 7,000 cigarettes per minute and sometimes greater than 10,000 cigarettes per minute. The adhesive composition of the present invention can be used at such high speeds in that the composition can be applied at a low viscosity and after application of heat by the rod heater garniture gels to a higher viscosity resulting in a high set speed and good wet tack. Many conventional starch-based adhesives cannot meet these sometimes competing requirements of low viscosity during application and high viscosity after heating to promote high set speed and good wet tack.

The following examples further illustrate certain embodiments of the invention and are not intended to be illustrative of all embodiments.

EXAMPLES

Example 1

An adhesive starch composition is prepared using a mixture of 20.0 percent ethylated starch, 15.0 percent unmodified corn starch (pearl starch), 10.0 percent urea and 54.65 percent of water along with 0.1 percent Nopco NXZ defoamer from Henkel Corporation and 0.25 percent Proxel GXL preservative from Zeneca Biocides. The ethylated starch is first dispersed in two-thirds of the water, and then swelled and dissolved by cooking in a jacketed kettle to about 85° C. The water/ethylated starch solution is then cooled to about 37° C. after which the urea dissolved in the dispersed corn starch and the remaining ingredients are added.

The prepared product has a solids content of 43 percent, a Brookfield viscosity of 1100 cps at 26° C., is viscosity stable over two months and had good flow and tack properties.

Referring to FIG. 1, a viscosity v. temperature plot for Example 1 is shown. The plot indicates that a significant change in viscosity occurs at a temperature of greater than 50° C. Thus the adhesive composition can be applied at low viscosity and then heated to increase viscosity (and wet tack and set speed).

Comparative Example

A comparative example of an adhesive starch composition was prepared using a mixture of 61.15 percent yellow potato dextrin, 6.15 percent waxy maize starch, 0.50 percent hydrogen peroxide solution (6 percent in water), and 31.45 percent of water along with 0.25 percent mineral oil antifoam and 0.5 percent benzisothiazolinone preservative. The yellow potato dextrin and the waxy maize starch were first dispersed in the water after which the hydrogen peroxide was added. The mixture was then heated to 85° C., cooked for 30 minutes and then cooled to 37° C., after which the defoamer and preservative were added.

The prepared product had a solids content of 63.5 percent, a Brookfield viscosity of 4300 cps at 26° C.

Referring to FIG. 2, a viscosity v. temperature plot for the Comparative Example is shown. The plot indicates that there is no change in viscosity for such a conventional starch-based adhesives after heating to greater than 60° C. Thus, its use as an adhesive for cigarettes is limited.

Example 2

An adhesive starch composition is prepared using a mixture of 29.0 percent carboxymethyl starch, 2.0 percent unmodified wheat starch, and 68.7 percent water, along with 0.1 percent mineral oil antifoam and 0.2 percent benzisothiazolinone preservative. The unmodified wheat starch is first dispersed in the water, after which the carboxymethyl starch is dissolved into the water/wheat starch mixture, and the defoamer and preservative are added.

The prepared product has a solids content of 31 percent, a Brookfield viscosity of 16,300 cps at 26° C., is viscosity stable over 3 months, and had good flow and tack properties. The wet tack and the set speed of the adhesive is found to be significantly higher compared to that of the adhesive produced without the use of unmodified dispersed starch.

Example 3

An adhesive starch composition is prepared using a mixture of 5.0 percent unmodified waxy maize starch, 4.8 percent casein, 1.9 percent methylhydroxypropyl cellulose, 0.5 percent ammonium hydroxide and 87.5 percent water, along with 0.1 percent Nopco NXZ defoamer from Henkel Corporation and 0.2 percent Proxel GXL preservative from Zeneca Biocides. The casein was first dispersed in half of the water with the ammonium hydroxide, the preservative and the defoamer are then added. The mixture is then heated to 80° C. in a jacketed kettle and mixed for 30 minutes. The methylhydroxypropyl cellulose is then dispersed into the mixture after which the remaining water was added to solubilize the methylhydroxypropyl cellulose. The mixture was then cooled to 37° C. after which the unmodified waxy maize starch is added.

The prepared product has a solids content of 11.5 percent, a Brookfield viscosity of 20,000 cps at 26° C., is viscosity stable over 3 months, and has good flow and tack properties.

Example 4

An adhesive composition is prepared using a mixture of 3.0 percent potassium alginate, 15.0 percent pastry flour (wheat starch) and 81.7 percent water, along with 0.1 percent Nopco NXZ defoamer from Henkel Corporation and 0.2 percent Proxel GXL preservative from Zeneca Biocides. The pastry flour is first dispersed in the water after which the potassium alginate is dissolved in the water/pastry flour mixture, and the defoamer and preservatives are then added.

The prepared product has a solids content of 18 percent, a Brookfield viscosity of 18,500 cps at 26° C., is viscosity stable over 3 months, and has good flow and tack properties.

Example 5

An adhesive starch composition is prepared using a mixture of 15.0 percent unmodified potato starch, 15.0 percent pregelatinized oxidized hydroxypropyl ether of potato starch, 15.3 percent of a xanthan gum solution (2 percent in water), and 54.6 percent of water along with 0.2 percent mineral oil antifoam and 0.2 percent benzisothiazolinone preservative. The unmodified potato starch is first dispersed in the water after which the pregelatinized potato starch ether is dissolved in the water/unmodified potato starch mixture and the remaining ingredients are added.

The prepared product had a solids content of 30 percent, a Brookfield viscosity of 3000 cps at 26° C., is viscosity stable over 3 months and has good flow and tack properties.

Example 6

An adhesive starch composition is prepared using a mixture of 9.0 percent pregelatinized hydroxypropyl ether of potato starch, 1.0 percent pregelatinized carboxymethyl ether of potato starch, 10.0 percent unmodified wheat starch, 20.0 percent potato dextrin, 0.2 percent xanthan gum, 0.05 percent ammonium hydroxide (25 percent solution in water) and 59.35 percent of water along with 0.2 percent mineral oil antifoam and 0.25 percent benzisothiazolinone preservative. The potato dextrin is first dispersed in two-thirds of the water after which the xanthan gum and the pregelatinized potato starch ethers are dissolved in the water/potato dextrin mixture. This mixture is then heated in a jacketed kettle to 85° C., cooked for 30 minutes and then cooled to 37° C. The unmodified wheat starch is then dispersed in the remaining one-third of the water in a separate container and then added to the batch, after which the remaining ingredients are added.

The prepared product has a solids content of 38 percent, a Brookfield viscosity of 3300 cps at 26° C., is viscosity stable over 3 months and has good flow and tack properties.

Example 7

An adhesive starch composition is prepared using a mixture of 9.05 pregelatinized hydroxypropyl ether of potato starch, 1.0 percent pregelatinized carboxymethyl ether of potato starch, 10.0 percent unmodified potato starch, 13.0 percent potato dextrin, 0.2 percent xanthan gum, 0.05 percent ammonium hydroxide (25 percent solution in water) and 66.35 percent of water along with 0.2 percent mineral oil antifoam and 0.2 percent benzilsothiazolinone preservative. The potato dextrin is first dispersed in two-thirds of the water after which the xanthan gum and the pregelatinized potato starch ethers are dissolved in the water/potato dextrin mixture. This mixture is then heated in a jacketed kettle to 85° C., cooked for 30 minutes and then cooled to 37° C. The unmodified potato starch is then dispersed in the remaining one-third of the water in a separate container and then added to the batch, after which the remaining ingredients are added.

The prepared product has a solids content of 31 percent, a Brookfield viscosity of 5500 cps at 26° C., is viscosity stable over 3 months and has good flow and tack properties.

That which is claimed is:

1. In a starch-based adhesive composition devoid of alkali for use in cigarette manufacturing comprising a modified starch and a theology modifier, the improvement comprising the addition of a dispersible unmodified starch that thickens on heating to a temperature greater than about 50° C.

2. The starch-based adhesive composition of claim 1 including about 0.1 to 5 percent by weight of a rheology modifier.

3. The starch-based adhesive composition of claim 2 wherein the rheology modifier is selected from the group consisting of urea, xanthan gum, casein, carrageen, guar gum, gum ghatti, gum karaya, locust bean gum, gum arabic, agglutinates, alginates, and cellulose ethers.

4. The starch-based adhesive composition of claim 1 including about 2 to 25 percent of the unmodified starch.

5. The starch-based adhesive composition of claim 1 wherein the dispersible unmodified starch is selected from the group consisting of maize, wheat, potato, arrowroot, rice, sago, barley, sorghum, rye, triticale, tapioca, waxy maize, waxy sorghum, sweet potato, waxy rice and mung bean starches.

6. The starch-based adhesive composition of claim 1 wherein the adhesive composition has an ambient temperature viscosity of about 1000 cps to 20,000 cps before thickening on heating to a temperature greater than about 50° C.

7. The starch-based adhesive composition of claim 1 wherein the adhesive composition has a solids content of about 10 to 60 percent.

8. The starch-based adhesive composition of claim 1 wherein the adhesive composition includes an anti-foaming agent or preservative or both.

9. The starch-based adhesive composition of claim 8 wherein the anti-foaming agent is a mineral oil.

10. The starch-based adhesive composition of claim 8 wherein the preservative is benzisothiazolinone.

11. A starch-based adhesive composition devoid of alkali for use in cigarette manufacturing comprising:

(a) 5 to 60 percent by weight of a modified starch;

(b) 2 to 25 percent by weight of a dispersible unmodified starch that thickens on heating to a temperature of at least about 50° C.;

(c) 0.1 to 5 percent of a rheology modifier selected from the group consisting of urea, xanthan gum, alginates, casein, carrageen, guar gum, gum ghatti, gum karaya, locust bean gum, gum arabic, agglutinates, alginates, and cellulose ethers;

(d) 0 to 1 percent by weight of a preservative; and, (e) 0 to 1 percent by weight of an anti-foaming agent.

12. The starch-based adhesive composition of claim 11 wherein the dispersible starch that thickens on heating to a temperature greater than about 50° C. is selected from the group consisting of maize, wheat, potato, arrowroot, rice, sago, barley, sorghum, rye, triticale, tapioca, waxy maize, waxy sorghum, sweet potato, waxy rice and mung bean starches.

13. The starch-based adhesive composition of claim 11 wherein the adhesive composition has a solids content of about 10 to 60 percent.

14. The starch-based adhesive composition of claim 11 wherein the anti-foaming agent is a mineral oil.

15. The starch-based adhesive composition of claim 11 wherein the preservative is benzisothiazolinone.

* * * * *